United States Patent [19]

Suzuki

[11] Patent Number: 4,674,105
[45] Date of Patent: Jun. 16, 1987

[54] DIGITAL SIGNAL PROCESSOR

[75] Inventor: Hideo Suzuki, Kawasaki, Japan

[73] Assignee: Kabushiki Kaisha Toshiba, Kawasaki, Japan

[21] Appl. No.: 705,530

[22] Filed: Feb. 26, 1985

[30] Foreign Application Priority Data

Mar. 2, 1984 [JP] Japan ................................ 59-40102

[51] Int. Cl.⁴ .......................................... H04L 27/22
[52] U.S. Cl. ...................................... 375/80; 375/81; 375/83; 329/50; 329/104; 329/145
[58] Field of Search ...................... 375/39, 78, 80, 81, 375/83, 86, 88, 90; 329/50, 104, 105, 110, 145; 370/20

[56] References Cited

U.S. PATENT DOCUMENTS

| | | | |
|---|---|---|---|
| 3,654,564 | 4/1972 | Tisi et al. | 375/86 |
| 3,697,881 | 10/1972 | Nakagome et al. | 375/86 |
| 3,806,815 | 4/1974 | Fletcher et al. | 375/81 |
| 3,970,946 | 7/1976 | Matsuo | 329/104 |
| 4,027,266 | 5/1977 | Clark | 329/105 |
| 4,048,572 | 9/1977 | Dogliotti et al. | 329/110 |
| 4,057,762 | 11/1977 | Namiki | 329/50 |
| 4,076,956 | 2/1978 | Dogliotti et al. | 375/86 |
| 4,090,145 | 5/1978 | Webb | 329/50 |
| 4,138,644 | 2/1979 | Godard et al. | 375/86 |
| 4,146,841 | 3/1979 | McRae | 329/110 |
| 4,165,488 | 8/1979 | Guidoux et al. | 375/86 |
| 4,225,964 | 9/1980 | Cagle et al. | 375/86 |
| 4,404,532 | 9/1983 | Welti | 375/86 |
| 4,470,147 | 9/1984 | Goatcher | 329/50 |
| 4,532,640 | 7/1985 | Bremer et al. | 375/39 |

Primary Examiner—Robert L. Griffin
Assistant Examiner—M. Huseman
Attorney, Agent, or Firm—Oblon, Fisher, Spivak, McClelland & Maier

[57] ABSTRACT

A digital signal processor for performing phase or frequency signal processes, for example, demodulating processes of modulation signals such as PSK signals. This processor is provided with amplitude-to-phase converting means which receives two digital input signal series that are respectively expressed by a plurality of bits and that have a quadrature phase relation with each other, and which outputs the digital phase information signal corresponding to a combination of the digital values of those input signal series, this combination being amplitude information. This processor then supplies the phase information signal which is outputted from the amplitude-to-phase converting means to signal processing means, thereby digitally processing the phase information signal.

13 Claims, 20 Drawing Figures

FIG. 3
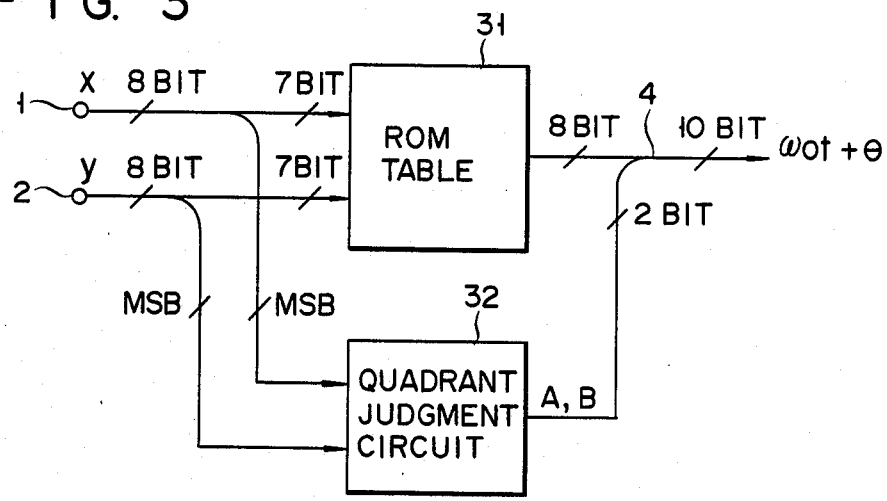
FIG. 4
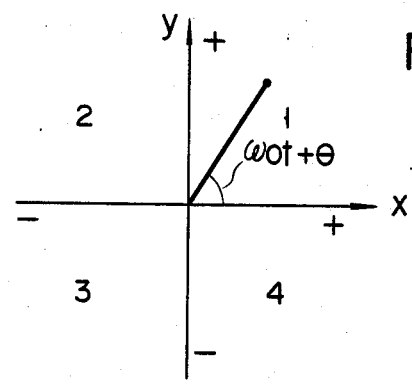
FIG. 5
| QUADRANT | SGN (X) | SGN (y) | A | B |
|---|---|---|---|---|
| 1 | 0 | 0 | 0 | 0 |
| 2 | 1 | 0 | 0 | 1 |
| 3 | 1 | 1 | 1 | 0 |
| 4 | 0 | 1 | 1 | 1 |
FIG. 6
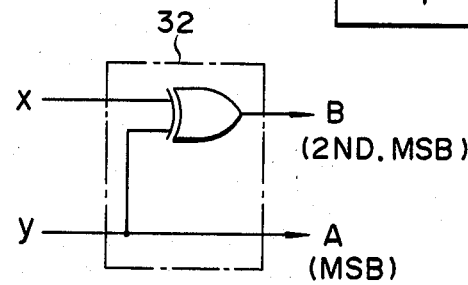

F I G. 7
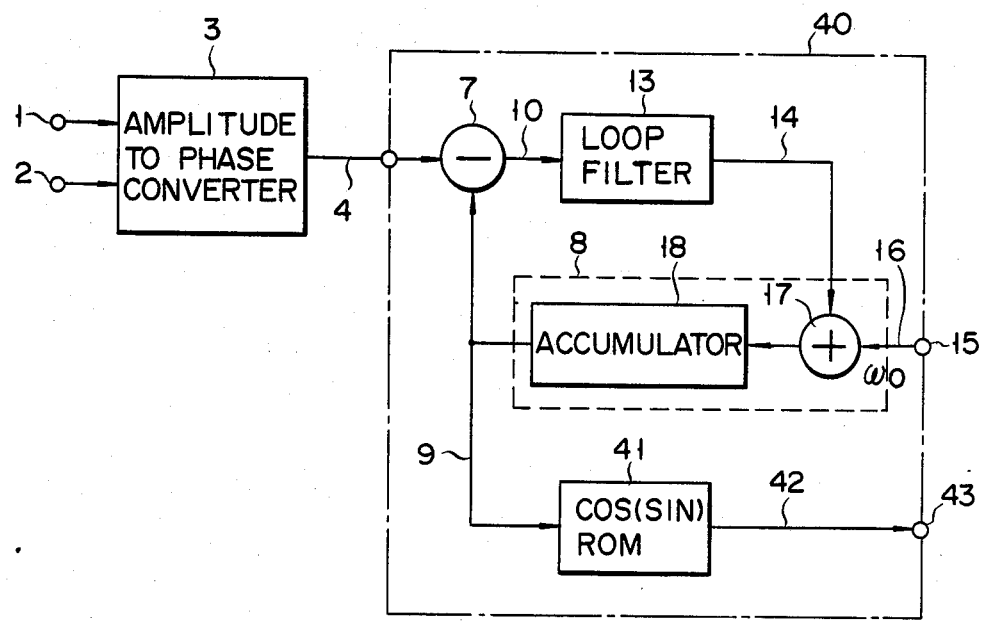
F I G. 8A
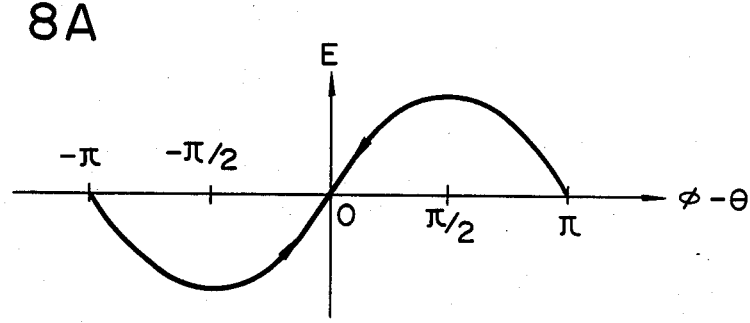
F I G. 8B
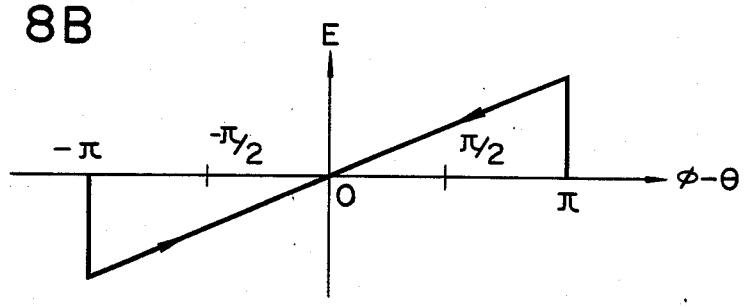

F I G. 16
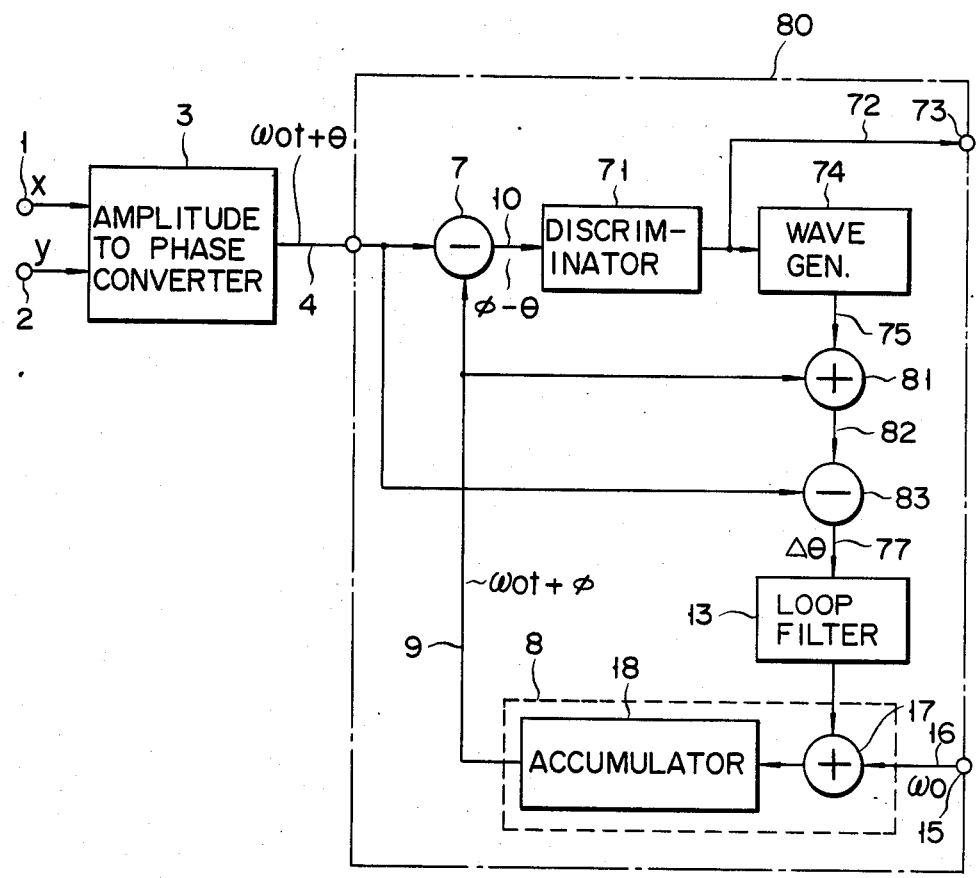

DIGITAL SIGNAL PROCESSOR

BACKGROUND OF THE INVENTION

The present invention relates to a digital signal processor and, more particularly, to a digital signal processor to which two digital signal series that are expressed by a plurality of bits and have a quadrature phase relation are inputted, and which performs the signal processes relative to the phase information or frequency information.

Due to the remarkable progress of recent integrated circuit technology, the technologies for converting analog signals to digital signals (namely, binary number) and processing the digital signals have been widely used in various fields including electronic communication. The digital signal generated from an A/D converter expresses an amplitude value of the original analog signal by a binary number. A conventional digital signal processor processes such a digital signal indicative of the amplitude value in the format as it is. In a system such as a data modem in the electronic communication field, a number of circuit apparatus such as a phase demodulator or phase synchronous circuit for handling phase information exist. Even in such circuit apparatus which handle the phase information, a conventional digital signal processor processes the digital signal representative of the amplitude value, thereby indirectly handling the phase information. When a practical example is mentioned, the synchronous demodulator for a BPSK (Binary Phase-Shift Keying) signal which is realized by a conventional digital signal processor executes the demodulating operations in accordance with the following procedure. Two digital signal series x and y which have a quadrature phase relation with each other are supplied as input BPSK signals to the demodulator. Further, two digital reference signals which have the quadrature phase relation with each other are also supplied to the synchronous demodulator as reference signals for synchronous demodulation. The two input signal series x and y are expressed as follows.

$$x = \cos(\omega_0 t + \theta) \quad (1)$$

$$y = \sin(\omega_0 t + \theta) \quad (2)$$

(where, $\theta = 0, \pi$: modulation phase). The two digital reference signals are respectively expressed by $\cos(\omega_0 t + \phi)$ and $\sin(\omega_0 t + \phi)$. The digital values that the input BPSK signals and reference signals take at every moment are amplitude information. A phase comparator provided in the demodulator first performs operations such as $$x\cos(\omega_0 t + \phi) + y\sin(\omega_0 t + \phi) \times \cos(\phi - \theta) \quad (3)$$

$$-x\sin(\omega_0 t + d) + y\cos(\omega_0 t + \phi) \times \sin(\phi - \theta) \quad (4)$$

by three multipliers, one adder and one subtracter. The digital signal expressed in equation (3) is outputted as the demodulation signal. Further, by multiplying those two signals by another multiplier, the digital error signal such as $$\tfrac{1}{2}\sin 2(\phi - \theta) \times \tfrac{1}{2}\sin 2\phi \quad (5)$$

is outputted. This error signal corresponds to the phase difference between the carrier phase of the signal series x and y and the phase $\phi$ of the reference signals irrespective of the modulation phase $\theta$ of the signal series x and y. This error signal is supplied to a reference signal generator through a loop filter. Thus, the phase of the reference signal is controlled such that the foregoing phase difference becomes zero.

In this way, in the conventional digital demodulator, as shown in equations (1) to (5), the phase difference $(\phi - \theta)$ is obtained due to the multiplication, addition and subtraction with respect to the amplitude information using the trigonometric function formulas, thereby generating the error signal. A problem has now arisen since a number of multipliers is needed. Among fundamental operation elements in the digital circuit, the multiplier is the hardware having the largest circuit scale. Therefore, the use of a number of multipliers makes it difficult to realize the digital demodulator by a few LSI (Large Scale Integration) chips. In addition, the use of multipliers is disadvantageous in terms of improvement in processing speed of the digital signal processor.

SUMMARY OF THE INVENTION

It is an object of the present invention to provide a digital signal processor in which the digital signal processes, relative to the phase information and/or frequency information, can be realized by a circuit arrangement having as small a scale as possible, and at the same time, the processing speed is high.

According to the present invention, the above object is accomplished by including: an amplitude-to-phase converting means which receives two digital signal series that are respectively expressed by a plurality of bits, and that have the quadrature phase relation with each other, and which outputs a digital phase information signal corresponding to a combination of digital values of these digital input signal series, said combination being amplitude information; and a signal processing means which receives the phase information signal outputted from the amplitude-to-phase converting means and which digitally processes the phase information signal.

The amplitude-to-phase converting means is realized by, for example, a ROM (Read Only Memory) table which stores the phase information as the digital values corresponding to all combinations of the digital values representative of the amplitude information in the foregoing two digital input signal series. Another practical example of the amplitude-to-phase converting means includes: a ROM table which stores the phase information corresponding to all combinations of the digital values indicative of the amplitude information of the above-mentioned input digital signal series in a partial quadrant of the phase plane where the two digital input signal series exist; and quadrant judgment means which discriminates the quadrant in the above phase plane corresponding to the combination of the digital values of the foregoing input digital signal series, said combination being amplitude information and which outputs a predetermined digital value responsive to the result of discrimination, wherein the digital values output from the ROM table and the digital values output from the quadrant judgment means are synthesized, so that the digital phase information signal corresponding to the combination of the digital values of those input digital signal series, being amplitudes information is generated.

The digital signal processor according to the present invention is suitable to receive the PSK (Phase-shift keying), FSK (Frequency-shift keying) and MSK (Minimum-shift keying) signals, and the signals modulated by other digital modulating methods as the foregoing input signal series and to demodulate those signals. In case of realizing a synchronous demodulator for the PSK signals on the basis of the present invention, the signal processing means generates, as the digital signal, the phase difference information signal indicative of the difference between the phase information serving as the reference for the synchronous demodulation which is given by the digital reference signal and the phase information which is given by the phase information signal outputted from the amplitude-to-phase converting means, thereby controlling the above-mentioned reference signal on the basis of this phase difference information signal. The demodulation signal is derived by adding the phase difference information signal and predetermined constant phase information which is given as a digital signal, or by discriminating the signs of the two modulated digital signal series on the basis of the phase difference information signal. In such digital signal processing means for demodulation, the phase information signal from the amplitude-to-phase converting means is processed, so that the multiplying processes performed by a conventional digital demodulator can be substituted by the adding and subtracting processes. The adder and subtracter in the digital circuit have minute circuit scales as compared with the multiplier. On the other hand, the amplitude-to-phase converting means can also be simply realized by using the ROM table as mentioned above. Therefore, in the digital signal processor according to the present invention, a certain desired function such as demodulation of digital modulation signals can be realized by hardware of a minute scale as compared with that in a conventional digital signal processor which processes an amplitude information signal as it is. In addition, since the adding and subtracting processes can be executed at a higher speed than in the multiplying processes, the digital signal processor according to the invention is also advantageous with regard to the processing speed, thereby making it possible to follow the signals inputted at a higher speed.

BRIEF DESCRIPTION OF THE DRAWINGS

FIG. 3 shows a block diagram of a practical example of amplitude-to-phase converting means according to the present invention;

FIG. 4 shows a phase plane for explaining the function of amplitude-to-phase converting means;

FIG. 5 is a diagram showing the relation between each quadrant in the phase plane shown in FIG. 4 and the result of judgment of the signs and quadrants of two input digital signal series;

FIG. 6 shows a circuit diagram of a practical example of a quadrant judgment circuit in FIG. 3;

FIG. 7 shows a block diagram of a digital signal processor for the carrier reproduction according to the second embodiment of the invention;

FIG. 8A shows a phase comparison characteristic by a conventional digital signal processor;

FIG. 8B shows a phase comparison characteristic of the signal processor in FIG. 7;

FIG. 16 shows a block diagram of a digital signal processor for the synchronous demodulation according to the sixth embodiment of the invention.

DETAILED DESCRIPTION OF THE PREFERRED EMBODIMENTS

Figure 1:
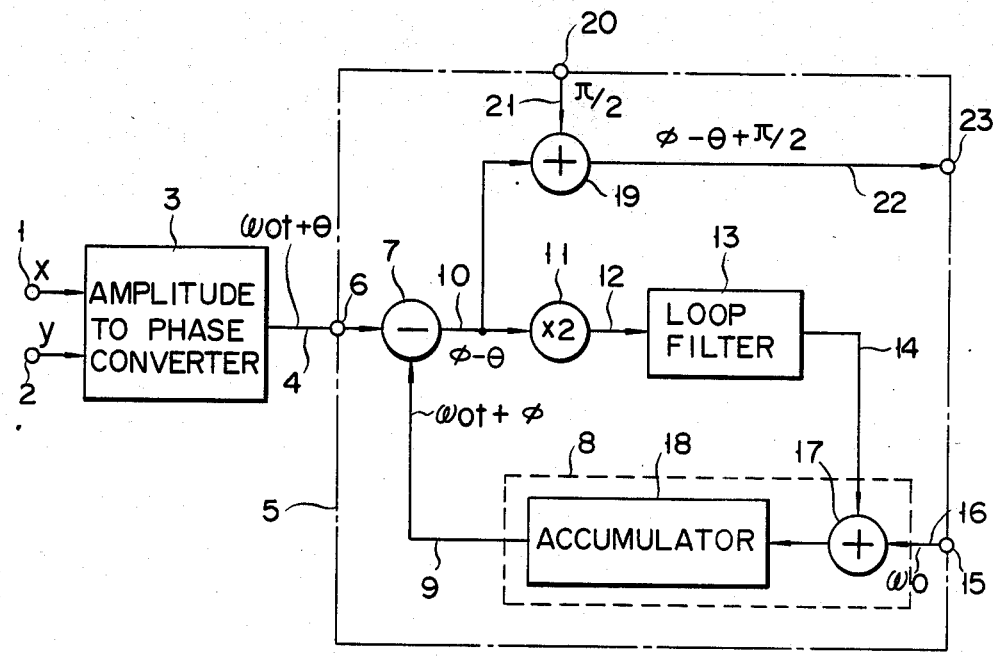
FIG. 1 shows a block diagram of a digital signal processor for the synchronous demodulation of two-phase PSK signals according to the first embodiment of the present invention.

As the first embodiment of the present invention, a digital signal processor for the synchronous demodulation of the two-phase PSK signals is shown in FIG. 1. In FIG. 1, two digital signal series x and y having the quadrature phase relation with each other, which are respectively shown in equations (1) and (2), are inputted to input terminals 1 and 2. In this embodiment, these input signal series x and y are obtained by quadrature-converting the two-phase PSK signals transmitted from the transmission side of a data modem and further by converting them to the binary signal, consisting of a plurality of proper bits (e.g., eight bits), through an A/D converter. The input signal series x and y are supplied to an amplitude-to-phase converter 3 and are converted to a digital phase information signal 4 corresponding to a combination of the digital values indicative of the amplitude information at every time. The phase information given by this phase information signal 4 is represented by $\omega_0 + t\theta$. $\omega_0 t$ is the carrier phase of the PSK signal, and $\theta$ is the modulation phase. In the case of the two-phase PSK signals, $\theta$ has two values of 0 and $\pi$.

The phase information signal 4 generated from the amplitude-to-phase converter 3 is supplied to an input terminal 6 of a signal processing circuit 5 constituted by a digital circuit. The signal processing circuit 5 demodulates the two-phase PSK signals constituting the input signal series x and y from the phase information signal 4.

In the signal processing circuit 5, a digital subtracter 7 generates a digital signal 10 indicative of the difference between the digital phase information signal 4 inputted to the terminal 6 and a digital reference signal 9 generated from a reference signal generator 8. The digital reference signal 9 provides the reference phase information $\omega_0 t + \theta$ for the synchronous demodulation. The signal 10 outputted from the subtracter 7 provides the information $\phi-\theta$ representative of the phase difference between the phase information $\omega_0 t+\theta$ given by the phase information signal 4 and the reference phase $\omega_0 t+\theta$ given by the digital reference signal 9. A coefficient multiplier 11 doubles the phase difference signal 10 and generates a digital signal 12 having the phase difference information of $2(\phi-\theta)$. The coefficient multiplier 11 is actually a bit shifter for shifting the signal 10 by one bit and is realized due to only the operation of the connection and no particular hardware is needed. A loop filter 13 constituted by a digital filter receives the signal 12 and suppresses the noise included in the signal 12, thereby generating a control signal 14. The reference signal generator 8 is controlled such that a value of $2(\phi-\theta)$ becomes zero. In the reference signal generator 8, a digital adder 17 adds the signal 14 outputted from the loop filter 13 and a digital frequency constant signal 16 which is supplied from an input terminal 15 and which provides the information of the angular frequency $\omega_0$. By supplying an output signal of the adder 17 to an accumulator 18, the reference signal 9 is generated.

A digital adder 19 adds the digital signal 10 which is outputted from the subtracter 7 and which gives the phase difference information $\phi-\theta$ and a digital signal 21 which is supplied from an input terminal 20 and which gives the phase information of $\pi/2$, thereby generating a digital signal 22 which provides the phase information of $\phi-\theta+\pi/2$. This signal 22 is led as the demodulation signal to an output terminal 23.

Figure 2:
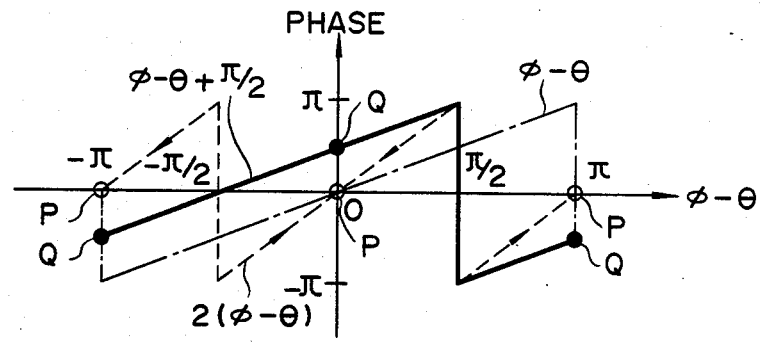
FIG. 2 shows a characteristic diagram of each signal generated in the signal processor in FIG. 1.

For clarification of the operation of the signal processor 5, FIG. 2 shows the relation between the phase difference information $\phi-\theta$ which is given by the signal 10 and each phase value of the phase information $2(\phi-\theta)$ which is given by the signal 12 and of the phase information $\phi-\theta+\pi/2$ which is given by the signal 22. The loop which is formed by the subtracter 7, coefficient multiplier 11, loop filter 13, reference signal generator 8, and subtracter 7 operates in a manner such that it delays the reference phase information $\omega_0+\phi$ when $2(\phi-\theta)$ indicates a positive value and it contrarily advances $\omega_0+\phi$ when $2(\phi-\theta)$ indicates a negative value. This loop becomes stable at points P where $2(\phi-\theta)$ is zero. A value of $\phi-\theta$ at the stable points P of this loop indicates either 0 or $\pi$ depending upon whether the modulation phase is 0 or $\pi$. However, $2(\phi-\theta)$ always indicates zero at the stable points P irrespective of whether $\theta$ is 0 or $\pi$, and its condition near points P is the same in both cases where $\theta$ is 0 and $\pi$. Therefore, the reference phase information $\omega_0 t+\phi$ is synchronized with the carrier phase due to the operation of the loop such that $2(\phi-\theta)$ becomes zero.

Since the demodulation signal 22 gives the phase information $\phi-\theta+\pi/2$, as shown in FIG. 2, it becomes stable at points Q corresponding to the stable points P of $2(\phi-\theta)$ and respectively indicates a positive digital value when a value of $\phi-\theta$ at points P is 0 and a negative digital value when a value of $\phi-\theta$ is $\pi$. Whether the value of $\phi-\theta$ is 0 or $\pi$ corresponds to whether the modulation phase $\theta$ is 0 or $\pi$; therefore, whether the digital value of the demodulation signal 22 is positive or negative eventually denotes whether the phase $\theta$ represents 0 or $\pi$. In this way, the demodulation signal 22 corresponding to the two-phase PSK signals is derived.

As described above, according to the digital signal processor of FIG. 1, the demodulating process of the PSK signal can be performed due to an advantageous arrangement including no multiplier which has a large circuit scale and which also becomes an adverse factor for improvement of the processing speed. The reason why such a process is made possible is because after the input signal series x and y were converted to the digital phase information signal 4 by the amplitude-to-phase converter 3, the process for demodulation is executed by the signal processing circuit 5.

The amplitude-to-phase converter 3 will now be described in detail. This converter 3 can be practically realized using a ROM table. In such a case, as the simplest method, the phase information $\omega_0 t+\theta$ within a range of 0° to 360° corresponding to all combinations of the digital values indicative of the amplitude information in the input signal series x and y may be stored as the digital values in the ROM table. The phase information $\omega_0 t+\theta$ is derived from $\tan^{-1} y/x$. When it is assumed that the signal series x and y are respectively expressed by eight bits and the phase information $\omega_0 t+\theta$ is also expressed by eight bits, the capacity required for this ROM table becomes $2^8 \times 2^8 \times 8 = 2^{19} = 2^9 \times 2^{10}$ bits = 512 kbits.

On the other hand, the amplitude-to-phase converter 3 can be more simply realized using a ROM table 31 and a quadrant judgment circuit 32 as shown in FIG. 3. In FIG. 3, the phase information corresponding to the combination of the digital values indicative of the amplitude information of the input signal series x and y in one quadrant (for example, the first quadrant) of the phase plane shown in FIG. 4, where the input signal series x and y exist, has been stored as the digital values in the ROM table 31. The quadrant judgment circuit 32 discriminates the quadrant where the instantaneous values of the signal series x and y actually exist in the phase plane shown in FIG. 4 and outputs predetermined digital values corresponding to the results of the judgment. FIG. 5 is a diagram to explain the function of the quadrant judgment circuit 32 and shows the relation among four quadrants, signs of the signal series x and y, and output digital values A and B of the quadrant judgment circuit 32. Namely, the quadrant judgment circuit 32 discriminates the quadrant from the MSB (most significant bit) indicative of the sign in the signal series x and y and outputs the two-bit digital values A and B of the combination corresponding to the quadrant discriminated. The quadrant judgment circuit 32 which performs such a logic operation can be practically realized by one exclusive OR circuit as shown in FIG. 6. Assuming that the signal series x and y are respectively expressed by eight bits, seven bits excluding the MSB among the respective eight bits are supplied to the ROM table 31. The two-bit digital values generated from the quadrant judgment circuit 32 are synthesized with the digital values of, e.g., eight bits which are generated from the ROM table 31 such that the bit A is used as the MSB and the bit B is used as the second MSB. This synthesized value is outputted as the digital phase information signal 4 from the amplitude-to-phase converter 3. In this case, the capacity required for the ROM table 31 becomes $2^7 \times 2^7 \times 8 = 2^{17} \times 2^{10}$ bits = 128 kbits. This capacity is less than that in the case where the quadrant judgment circuit is not used.

The second embodiment of the present invention will now be described with reference to FIG. 7. The digital signal processor in this embodiment is constituted by using a PLL (phase-locked loop) and serves to obtain the digital signal series (reproduction carrier signals) whose phases are synchronized with the input signal series x and y. This processor is also realized using no multiplier. It is assumed that the input signal series x and y are not modulated in this embodiment. A signal processing circuit 40 is constituted in a manner such that the coefficient multiplier 11 and adder 19 are removed from the signal processor 5 in FIG. 1, and a cosine (or sine) ROM 41 is provided in place of them.

The ROM 41 receives the digital reference signal 9 generated from the reference signal generator 8 and generates a digital signal 42 corresponding to the cosine conversion value or sine conversion value of the phase information $\omega_0 t + \phi$ and sends this signal reproduced carrier signal to a terminal 43.

In a conventional PLL, a multiplier is used for comparison of the phases of the input signal and reference signal and the phase comparison characteristic, namely, the relation between the phase difference $\phi - \theta$ between the input signal and the reference signal and a phase error signal E has a sine wave form as shown in FIG. 8A. In this characteristic of FIG. 8A, when the absolute value of $\phi - \theta$ lies within a range of $\pi/2$ to $\pi$, particularly, near $\pi$, upon initial lead-in of the loop, the level of the phase error signal E is small; therefore, there is a problem such that it takes a long time for the phase of the reference signal to enter the lead-in range of the loop. According to the PLL shown in FIG. 7, such a problem is solved. In FIG. 7, the phase information corresponding to the combinations of the digital values indicative of the amplitude information in the input signal series x and y has been stored as the digital values in the ROM table in the amplitude-to-phase converter 3 such that the relation between the phase difference $\phi - \theta$ and the phase error signal E (output signal 14 of the loop filter 13) becomes the characteristic shown by a solid line in FIG. 8B. According to the characteristic of the solid line in FIG. 8B, as a value of $\phi - \theta$ increases (that is, as the phase $\phi$ of the reference signal 9 is away from the phases $\theta$ of the input signal series x and y), the level of the phase error signal 14 becomes large. Consequently, the initial lead-in time of the loop is reduced.

Figure 9:
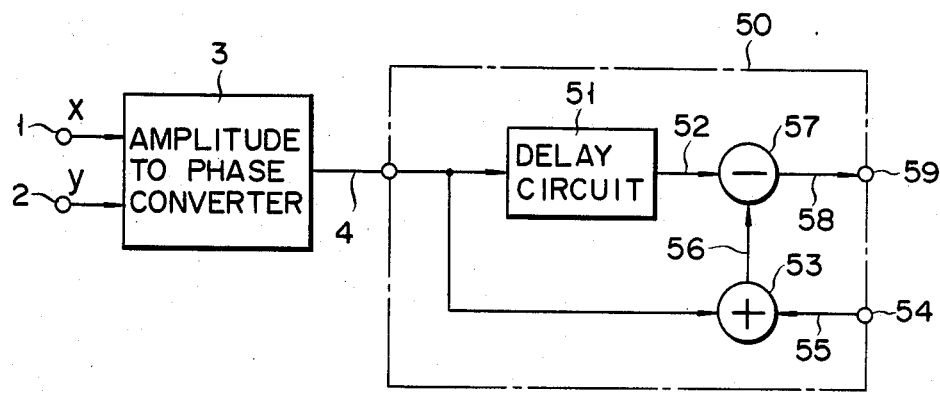
FIG. 9 shows a block diagram of a digital signal processor for the delay demodulation of the PSK signals according to the third embodiment of the invention.

FIG. 9 shows the third embodiment of the present invention and shows a digital signal processor for the delay demodulation of the four-phase PSK signals. In a signal processing circuit 50, the phase information signal 4 outputted from the amplitude-to-phase converter 3 is delayed by a digital delay circuit 51 by only the time corresponding to one-symbol interval of the input signal series x and y (four-phase PSK signals). A digital adder 53 adds a digital phase information signal 55 which is supplied from a terminal 54 and which gives the constant phase of $\pi/4$ and the phase information signal 4 outputted from the amplitude-to-phase converter 3. A digital subtracter 57 calculates the difference between a digital signal 56 outputted from the adder 53 and a digital signal 52 outputted from the delay circuit 51 and transmits a difference signal 58 as a demodulation signal to an output terminal 59.

Figure 10:
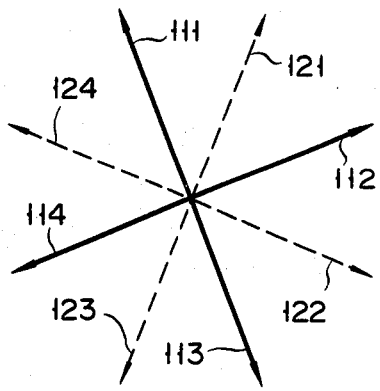
FIG. 10 shows a phase vector diagram for explaining the operation in the embodiment of FIG. 9.

FIG. 10 is a phase plane view to explain the demodulating operations in this embodiment, in which solid lines 111 to 114 denote locations of the transmission phase symbols of the input signal series x and y. These transmission phase symbols are delayed by the delay circuit 51 by only the time corresponding to the duration of one-symbol interval and also become the phase symbols indicated by the solid lines 111 to 114. As indicated by broken lines 121 to 124, the adder 53 outputs a signal of which either one of the o locations 111 to 114 was phase-shifted by only $\pi/4$. The subtracter 57 obtains the phase difference between this phase-shifted signal and the signal which was not shifted. The output signal 58 of the subtracter 57 is the demodulation signal of which either one of four pieces phase information of 0, $\pi/2$, $\pi$, and 3 $\pi/2$ were expressed by the digital signal in correspondence to the transmission phase symbols of the signal series x and y. Only the higher significant two bits of the digital demodulation signal 58 may be selected as necessary. The higher significant two bits have two values from the values of 00, 01, 10, and 11 in accordance with the four transmission phase difference symbols.

In a conventional delay demodulator, the demodulation signal is derived by multiplying the input modulation signal with the signal of which it was delayed. However, according to the present invention, the delay demodulating processes are accomplished using no multiplier as described above.

Figure 11:
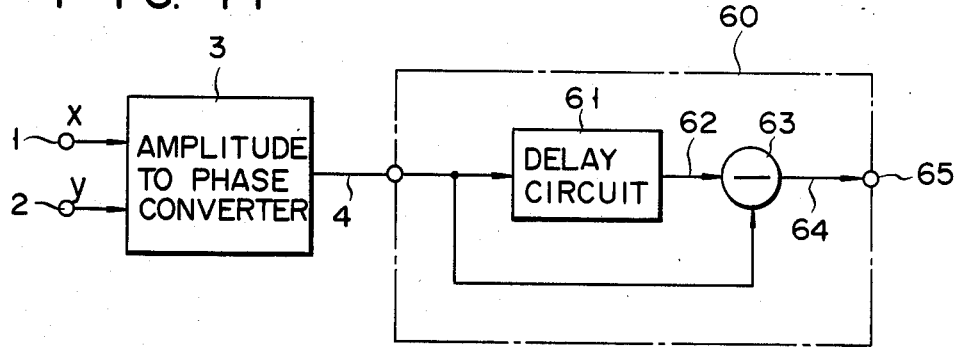
FIG. 11 shows a block diagram of a digital signal processor for the delay demodulation of the FSK signals according to the fourth embodiment of the invention.

FIG. 11 shows the fourth embodiment of the present invention and shows a digital signal processor for the delay demodulation of the FSK signals. In a signal processing circuit 60, a digital subtracter 63 calculates the difference between the digital phase information signal 4 outputted from the amplitude-to-phase converter 3 and a signal 62 of which the signal 4 was delayed by a delay circuit 61 by a time (e.g., one-symbol interval) that is sufficiently shorter than the one-symbol interval of the input signal series x and y (FSK signals). Then, the digital subtracter 63 transmits a difference signal 64 as a demodulation signal to an output terminal 65. In this embodiment as well, since the input signal to the signal processing circuit 60 is the phase information signal 4, the delay demodulating processes can be easily realized using the subtracter 63 in place of the multiplier.

Figure 12:
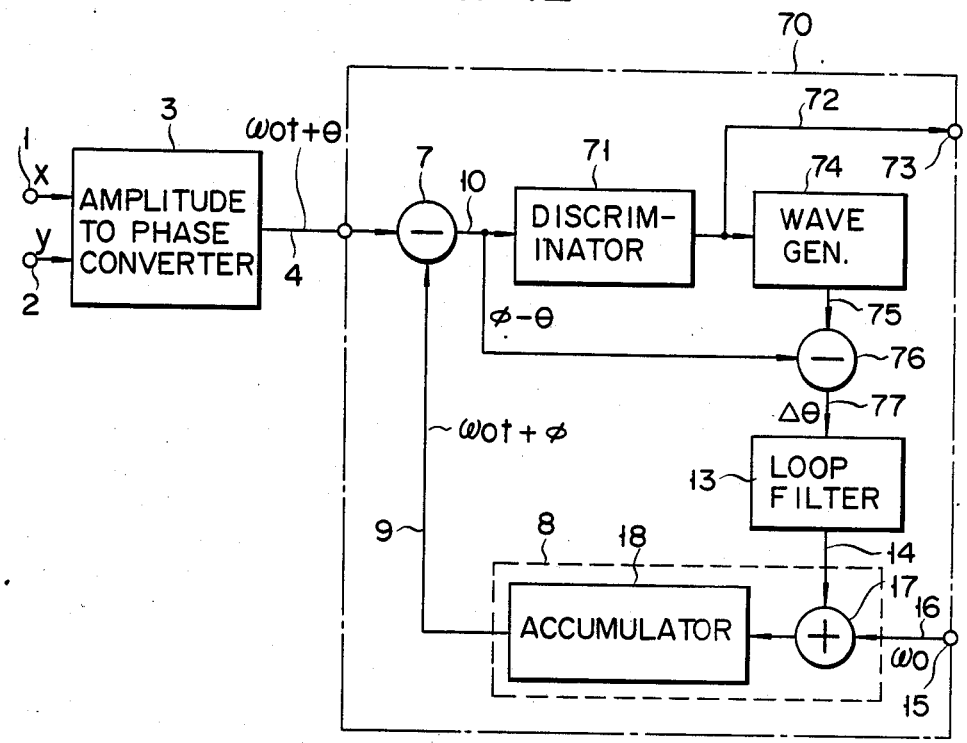
FIG. 12 shows a block diagram of a digital signal processor for the synchronous demodulation according to the fifth embodiment of the invention.

FIG. 12 shows the fifth embodiment of the present invention and shows a digital signal processor for the synchronous demodulation of the MSK signals. In a signal processing circuit 70, the signal 10 outputted from the subtracter 7 is given to a discriminator 71, so that the signs of the input signal series x and y (MSK signals) are discriminated by the discriminator 71. The discriminator 71 can be practically realized by a time differentiator.

Figure 13A:
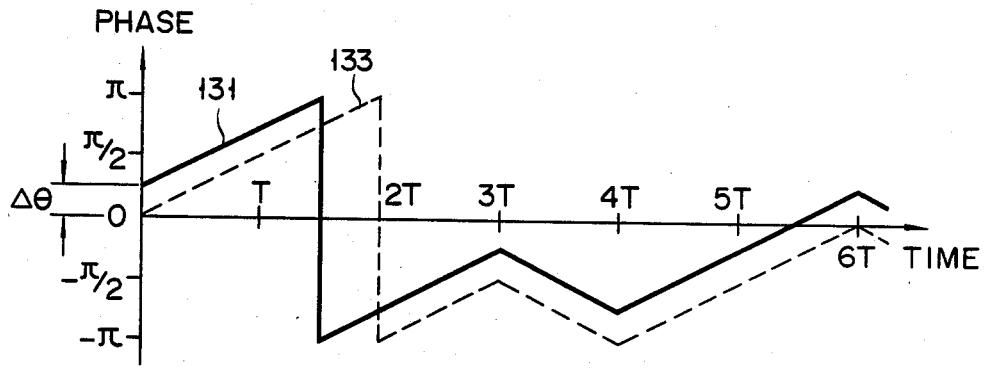
FIGS. 13A and 13B show timing charts for explaining the operations in the case where the processor in FIG. 12 performs the synchronous demodulation of the MSK signals.
Figure 13B:
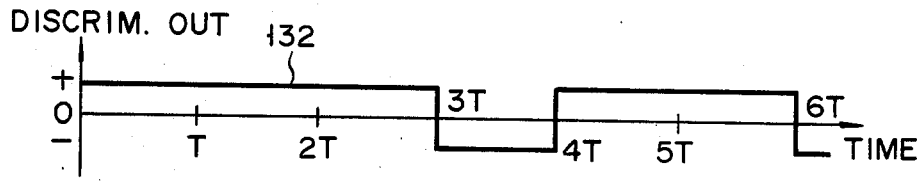

The MSK is one kind of binary FSK and, in particular, by setting the frequency deviation of modulation signal to $f_R/4$ with regard to a reference clock frequency $f_R$, the phase shift amount per period (T = 1/$f_R$) is set to $\pi/2$. Therefore, when the MSK signals are given as the input signal series x and y, $\theta$ in the phase information $\omega_0 t + \theta$ given by the digital information signal 4 generated from the amplitude-to-phase converter 3 denotes a change indicated by, for instance, a solid line 131 in FIG. 13A. In this case, the modulation phase $\theta$ is $0 = \pm \pi t/2T$. Whether the slope of the line 131 is positive or negative corresponds to whether the signs of the signal series x and y are "1" or "0". At this time, for instance, as shown by a solid line 132 of FIG. 13B, a digital signal 72 outputted from the discriminator 71 indicates a positive value when the slope of the solid line of FIG. 13A is positive and a negative value when the slope is negative. This signal 72 is led as the demodulation signal to an output terminal 73.

A wave generator 74 is constituted by, e.g., an accumulator and receives the demodulation signal 72 generated from the discriminator 71 and generates a reproduced modulation waveform signal 75 representing the phase change as indicated by a broken line 133 in FIG. 13A. This signal 75 corresponds to a change in phase information $\phi_0 t + \theta$ including the modulation phase $\theta$. A digital subtracter 76 calculates the difference between the signal 75 and the digital signal 10 which is outputted from the subtracter 7 and which gives the phase difference $\phi - \theta$. The subtracter 76 removes the components of the modulation phase $\theta$ included in both signals 75 and 10 and generates, as a digital signal, a phase error signal 77 indicative of the phase error $\Delta\theta$ of the phase $\omega_0 t + \phi$ of the reference signal 9 generated by the reference signal generator 8. This phase error signal 77 is supplied through the loop filter 13 to the adder 17 in the reference signal generator 8, thereby allowing the reference signal 9 to be controlled such that the phase error $\Delta\theta$ becomes zero.

In addition to the component element of the demodulator for the PSK signals, a conventional demodulator for the MSK signals further needs a reference clock extractor for the carrier reproduction and another multiplier. In the digital signal processor for the demodulation of the MSK signals according to this embodiment, these complicated circuits for the carrier reproduction are unnecessary, so that this allows the hardware scale to be remarkably reduced. On one hand, the conventional demodulator for the MSK signals has a problem such that the unnecessary harmonic components which become the jitter of the reproduction carrier in the step of multiplication for the carrier reproduction are produced. However, according to the present invention, such harmonic components do not essentially occur, so that the performance is improved. The present invention can be also applied to the demodulating processes of the modulation signal due to a modulating method of which the MSK was further developed. For example, the invention can be applied to the demodulating processes of the modulation signal having a smooth change in modulation phase such as the GMSK (Gaussian filtered MSK) in which the transmission band can be further narrowed as compared with the ordinary MSK.

Figure 14:
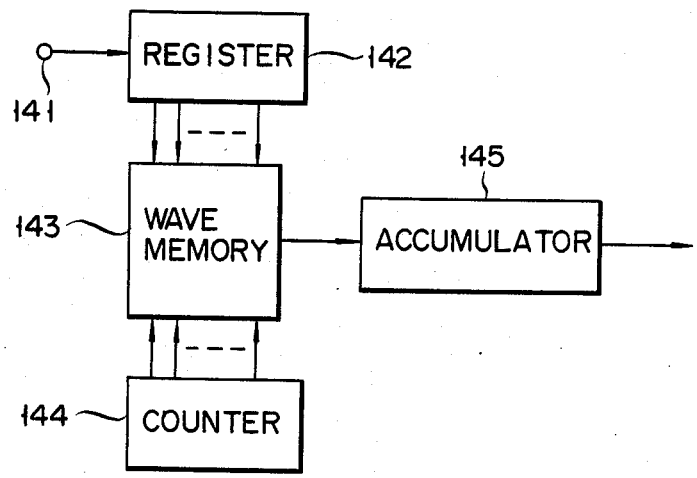
FIG. 14 shows a circuit diagram of a practical example of a wave generator in FIG. 12.
Figure 15A:
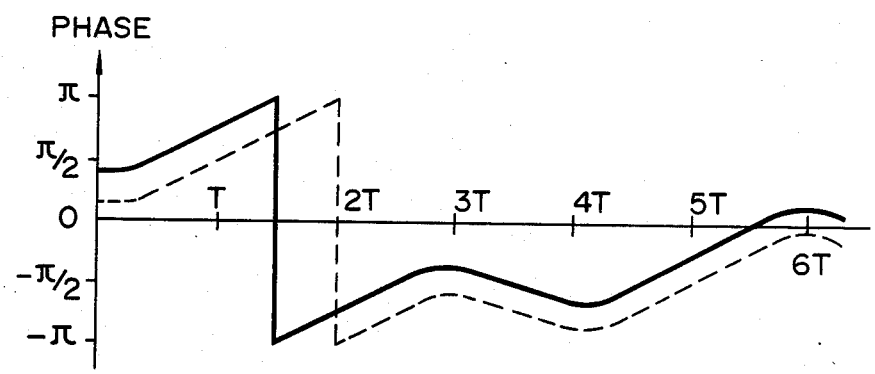
FIGS. 15A and 15B show timing charts for explaining the operations in the case where the processor in FIG. 13 performs the synchronous demodulation of the GMSK signals.
Figure 15B:
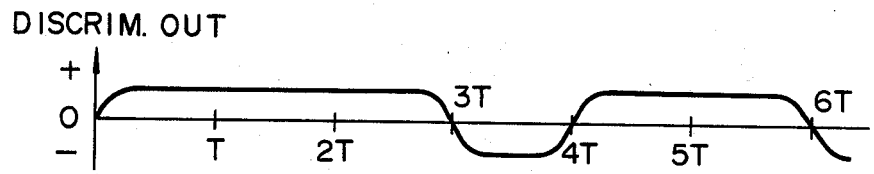

In the demodulating processes of the GMSK signals, it is desirable that the wave generator 74 in FIG. 12 is constituted as shown in FIG. 14. In FIG. 14, the demodulation signal 72 outputted from the discriminator 71 in FIG. 12 is inputted to a terminal 141, and the information as much as the constant time interval is sampled and stored in a register 142. Various kinds of modulation signal waveforms which are forecasted have been preliminarily digitally stored in a wave memory 143. The address corresponding to the content (namely, locus of the demodulation signal 72 for the constant interval) of the register 142 is accessed, and the content of the address is read out from the memory 143. A counter 144 is driven in response to a high-speed clock, thereby accessing so as to complement the addresses in the wave memory 143 among the addresses which were sequentially accessed by the register 142. The information read out from the wave memory 143 is supplied as the reproduced modulation waveform signal 75 to the subtracter 76 in FIG. 12 through an accumulator 145. The counter 144 may be omitted if the information inputted to the register 142 has been sufficiently finely sampled. The accumulator 145 may be also omitted if the preliminarily integrated modulation waveforms have been stored in the wave memory 143. In the demodulation of the GMSK signals, the waveforms corresponding to FIGS. 13A and 13B become smooth as shown in FIGS. 15A and 15B, respectively.

Figure 17:
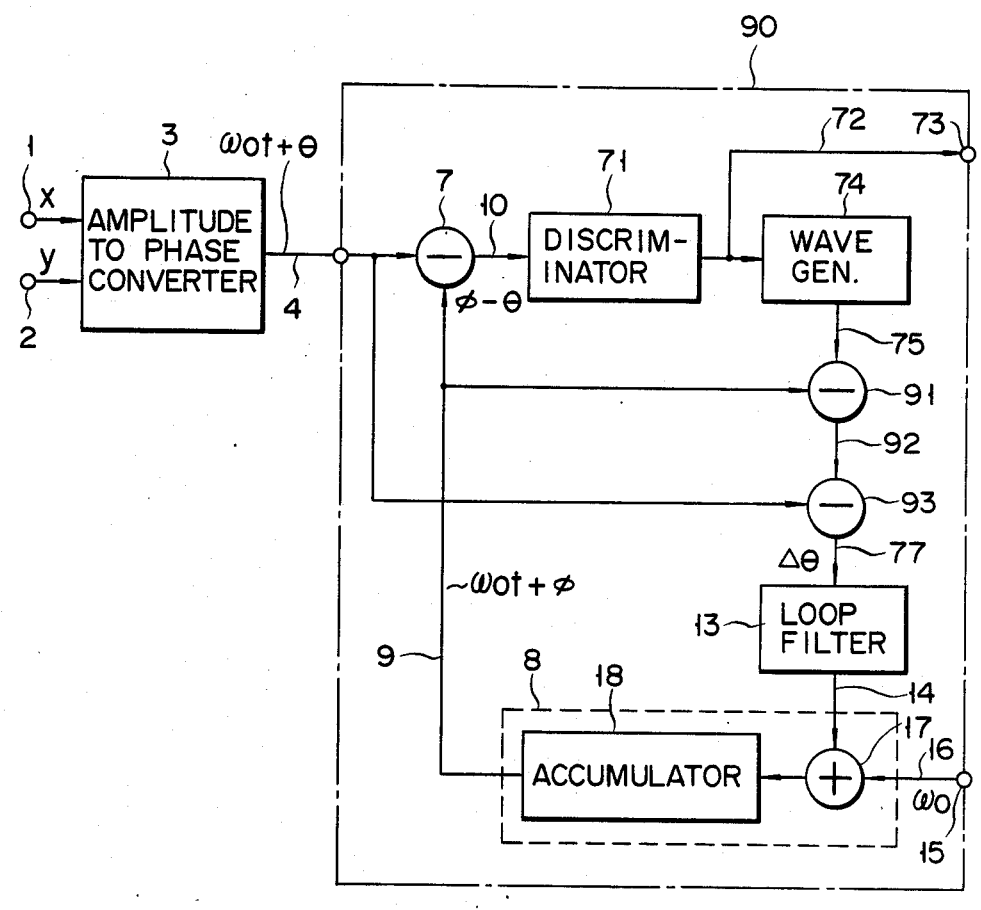
FIG. 17 shows a block diagram of a digital signal processor for the synchronous demodulation according to the seventh embodiment of the invention.

FIGS. 16 and 17 show the sixth and seventh embodiments of the present invention in which the embodiment shown in FIG. 12 is modified. In the embodiment of FIG. 12, the phase difference signal 10 which was dropped to the baseband by the subtracter 7 is supplied to the subtracter 76 and the difference between the signal 10 and the reproduced modulation waveform signal 75 outputted from the wave generator 74 is calculated, thereby eliminating the modulation phase components. On the other hand, in FIG. 16, in a signal processing circuit 80, the reference signal 9 is supplied to a digital adder 81, and the signal 75 generated from the wave generator 74 is modulated in the adder 81 due to the reference signal 9, thereby eliminating the modulation phase components of the input signal series x and y. The carrier frequency component ($\omega_0 t$) is included in a signal 82 outputted from the adder 81. A digital subtracter 83 calculates the difference between the signal 82 and the phase information signal 4 outputted from the amplitude-to-phase converter 3, thereby eliminating the carrier frequency component. Then, the subtracter 83 generates the phase error signal 77 and supplies it to the loop filter 13.

In FIG. 17, in a signal processing circuit 90, the phase information signal 4 outputted from the amplitude-to-phase converter 3 and the reproduced modulation waveform signal 75 in the baseband generated from the wave generator 74 are supplied to a digital subtracter 91, and the signal 4 is reversely modulated in the subtracter 91 due to the signal 75, thereby eliminating the modulation phase components. A signal 92 outputted from subtracter 91 includes the noise. A digital subtracter 93 calculates the difference between the signal 92 and the reference signal 9 and generates the phase error signal 77 and supplies it to the loop filter 13, thereby eliminating the noise.

In the embodiments shown in FIGS. 16 and 17 as well, by changing the arrangement of the wave generator 14, the invention can be applied to the demodulation of the GMSK signals. It will be obviously understood that the embodiments in FIGS. 12, 16 and 17 can be further applied to the demodulating processes of the modulation signals due to other similar modulating methods such as the continuous phase FSK, PSK or offset PSK.

What I claim is:

1. A digital signal processor comprising:
   amplitude-to-phase converting means which receives two modulated digital input signal series that are respectively expressed by a plurality of bits and that have a quadrature relation and which outputs a digital phase information signal corresponding to a combination of digital values of said input signal series, said digital values being amplitude information;
   means for generating a digital reference signal;
   means for generating, as a digital signal, a phase difference signal indicative of the difference between the phase information which is given due to said digital reference signal and the phase information which is given due to the phase information signal which is outputted from said amplitude-to-phase converting means;
   means for outputting a demodulation signal on the basis of said phase difference signal; and
   means for controlling said reference signal on the basis of said phase difference signal.

2. A digital signal processor according to claim 1, wherein said amplitude-to-phase converting means includes a ROM table which stores the phase information as the digital values corresponding to all combinations of the digital values of said input signal series.

3. A digital signal processor according to claim 1, wherein said amplitude-to-phase converting means includes:
   a ROM table which stores the phase information as the digital values corresponding to all combinations of the digital values of said input signal series in a partial quadrant of a phase plane where said input signal series exist;
   quadrant judgment means for discriminating the quadrant in said phase plane corresponding to the combination of the digital values of said input signal series and outputting predetermined digital values corresponding to the result of said discrimination; and
   means for synthesizing the digital values which are outputted from said ROM table and the digital values which are outputted from said quadrant judgment means, thereby outputting the digital phase information signal corresponding to the combination of the digital values of said input signal series.

4. A digital signal processor according to claim 1, wherein said means for outputting a demodulation signal by adding said phase difference signal and predetermined constant phase information which is given as a digital signal.

5. A digital signal processor comprising:
   amplitude-to-phase converting means which receives two modulated digital input signal series that are respectively expressed by a plurality of bits and that have a quadrature relation and which outputs a digital phase information signal corresponding to a combination of digital values of said input signal series, said digital values being amplitude information;
   means for generating a digital reference signal;
   means for outputting, as a digital signal, a phase difference information signal indicative of the difference between the phase information which is given due to the phase information signal which is outputted from said amplitude-to-phase converting means and the phase information which is given due to said reference signal;
   means for outputting a demodulation signal by discriminating signs of the original data of said modulation signals on the basis of said phase difference signal;
   means for outputting, as a digital signal, a reproduced modulation waveform signal corresponding to the phase information which is given due to the phase information signal which is outputted from said amplitude-to-phase converting means on the basis of said demodulation signal; and
   means for controlling said reference signal on the basis of said reproduced modulation waveform signal.

6. A digital signal processor according to claim 5, wherein said amplitude-to-phase converting means includes a ROM table which stores the phase information as the digital values corresponding to all combinations of the digital values of said input signal series.

7. A digital signal processor according to claim 5, wherein said amplitude-to-phase converting means includes:
   a ROM table which stores the phase information as the digital values corresponding to all combinations of the digital values of said input signal series in a partial quadrant of a phase plane where said input signal series exist;
   quadrant judgment means which discriminates the quadrant in said phase plane corresponding to the combination of the digital values of said input signal series and which outputs predetermined digital values corresponding to the result of said discrimination; and
   means which synthesizes the digital values which are outputted from said ROM table and the digital values which are outputted from said quadrant judgment means, thereby outputting the digital phase information signal corresponding to the combination of the digital values of said input signal series.

8. A digital signal processor according to claim 5, wherein said means for outputting the demodulation signal differentiate said phase difference signal with respect to time.

9. A digital signal processor according to claim 5, wherein said means for outputting said reproduced modulation waveform signal includes a wave memory in which modulation signal waveform information corresponding to the phase information which is given due to the phase information signal that can be outputted from said amplitude-to-phase converting means has been preliminarily stored as digital values and which is accessed due to the information content for a predetermined constant interval of said demodulation signal.

10. A digital signal processor according to claim 9, wherein said means for outputting said reproduced modulation waveform signal further includes means for accumulating an output signal from said wave memory.

11. A digital signal processor according to claim 5, wherein said means for controlling said reference signal includes:
   means for outputting a difference signal between said phase difference signal and said reproduced modulation waveform signal; and
   means for controlling said reference signal such that said difference signal is minimized.

12. A digital signal processor according to claim 5, wherein said means for controlling said reference signal includes:
   means for modulating said reproduced modulation waveform signal with said reference signal;
   means for outputting a difference signal between a modulation signal which is outputted from said modulating means and the phase information signal which is outputted from said amplitude-to-phase converting means; and
   means for controlling said reference signal such that said difference signal is minimized.

13. A digital signal processor according to claim 5, wherein said means for controlling said reference signal includes:
   means for modulating the phase information signal which is outputted from said amplitude-to-phase converting means with said reproduced modulation waveform signal;
   means for outputting a difference signal between a signal which is outputted from said modulating means and said reference signal; and
   means for controlling said reference signal such that said difference signal is minimized.

* * * * *